US011117052B2

(12) United States Patent
Takahara et al.

(10) Patent No.: US 11,117,052 B2
(45) Date of Patent: Sep. 14, 2021

(54) GAME DEVICE, CONTROL METHOD OF GAME DEVICE, AND STORAGE MEDIUM THAT CAN BE READ BY COMPUTER

(71) Applicant: CAPCOM CO., LTD., Osaka (JP)

(72) Inventors: Kazuhiro Takahara, Osaka (JP); Keisuke Yamakawa, Osaka (JP); Hiroshi Hattori, Osaka (JP)

(73) Assignee: CAPCOM CO., LTD., Osaka (JP)

( * ) Notice: Subject to any disclaimer, the term of this patent is extended or adjusted under 35 U.S.C. 154(b) by 342 days.

(21) Appl. No.: 16/307,024

(22) PCT Filed: Jun. 6, 2017

(86) PCT No.: PCT/JP2017/020959
§ 371 (c)(1),
(2) Date: Dec. 4, 2018

(87) PCT Pub. No.: WO2017/213131
PCT Pub. Date: Dec. 14, 2017

(65) Prior Publication Data
US 2020/0306636 A1  Oct. 1, 2020

(30) Foreign Application Priority Data

Jun. 7, 2016  (JP) .............................. JP2016-113579

(51) Int. Cl.
*A63F 13/53* (2014.01)
*A63F 13/428* (2014.01)
(Continued)

(52) U.S. Cl.
CPC ............ *A63F 13/53* (2014.09); *A63F 13/428* (2014.09); *A63F 13/525* (2014.09);
(Continued)

(58) Field of Classification Search
USPC .......................................................... 463/31
See application file for complete search history.

(56) References Cited

U.S. PATENT DOCUMENTS 9,256,069 B2    2/2016  Wada
10,525,352 B2 *  1/2020  Noda .................... G06F 3/0346
(Continued)

FOREIGN PATENT DOCUMENTS

| JP | 2003325969 A | 11/2003 |
|---|---|---|
| JP | 5869177 B1 | 1/2016 |
| JP | 5914739 B1 | 4/2016 |

OTHER PUBLICATIONS

Boucher, Robin, "Example of measures against VR sickness," GREE Advent Calendar 2015 5th day, Dec. 5, 2015.

*Primary Examiner* — Pierre E Elisca
(74) *Attorney, Agent, or Firm* — IP Business Solutions, LLC (57) ABSTRACT

In a case where operations to a player character are restricted and a virtual camera is controlled according to event data, motion of the user's head, which is detected by an HMD 300, is reflected on the direction of the virtual camera that is set based on the event data. As a result, even in a situation where the user cannot operate the player character as he/she wants, images displayed on the HMD 300 move together with motion of the head. Therefore, it is possible to reduce occurrence of simulator sickness.

15 Claims, 8 Drawing Sheets

(51) Int. Cl.
*A63F 13/525* (2014.01)
*G02B 27/01* (2006.01)
(52) U.S. Cl.
CPC ..... *G02B 27/0101* (2013.01); *G02B 27/0172* (2013.01); *G02B 27/0179* (2013.01); *G02B 2027/0138* (2013.01); *G02B 2027/0187* (2013.01)

(56) References Cited

U.S. PATENT DOCUMENTS

| | | | |
|---|---|---|---|
| 2008/0180438 A1* | 7/2008 | Sasaki | A63F 13/10 345/420 |
| 2015/0325027 A1 | 11/2015 | Herman et al. | |
| 2017/0076496 A1* | 3/2017 | Inomata | G06F 3/012 |

* cited by examiner

GAME DEVICE, CONTROL METHOD OF GAME DEVICE, AND STORAGE MEDIUM THAT CAN BE READ BY COMPUTER

TECHNICAL FIELD

The present invention relates to an image processing technique of a virtual reality space using a head mount display.

BACKGROUND ART

In recent years, a virtual reality (VR) technique using a head mount display (HMD) has been becoming common. In a VR game for providing virtual reality using an HMD, a user can get a sense as if he/she actually exists in a virtual three-dimensional (3D) space.

CITATION LIST

Patent Literature

[Patent Literature 1] Japanese Unexamined Patent Application Publication No. 5565258
[Patent Literature 2] Japanese Unexamined Patent Application Publication No. 5869177

SUMMARY OF THE INVENTION

Problems to be Solved by the Invention

In VR games, there is difficulty in game playing since simulator sickness easily occurs due to a high level of immersion.

One of the reasons for simulator sickness is considered to be a gap between an image displayed on an HMD and the sense of a user. For example, in a case where the user's head is turned to the right, if the direction of the virtual camera in a virtual 3D space is turned to the right together with the motion of the user's head, a gap does not occur between the image and the sense of the user. If the motion of the virtual camera is delayed or if the direction of the virtual camera is fixed and the virtual camera does not move together with the motion of the user's head, a gap occurs between the image and the sense of the user.

The present invention is made in view of the above and aims to reduce occurrence of simulator sickness in a VR space using an HMD.

Means for Solving the Problems

To solve the above problem, the game device according to the present invention is a game device that provides a game for a user to play with a head mount display on, the game device including: an input unit configured to input a direction of a head of the user from the head mount display; and a camera control unit configured to control a virtual camera in a virtual space by reflecting the direction of the head of the user on a direction of a player character, which is operated by the user. The camera control unit controls the virtual camera by reflecting the direction of the head of the user on the direction of the player character even in a case where an operation to the player character by the user is restricted.

Effect of the Invention

According to the present invention, even in a case where operations to a player character are restricted, a camera control unit reflects motion of the user's head on the virtual camera, so that it is possible to reduce occurrence of simulator sickness in a VR space using an HMD.

MODE FOR CARRYING OUT THE INVENTION

Figure 1:
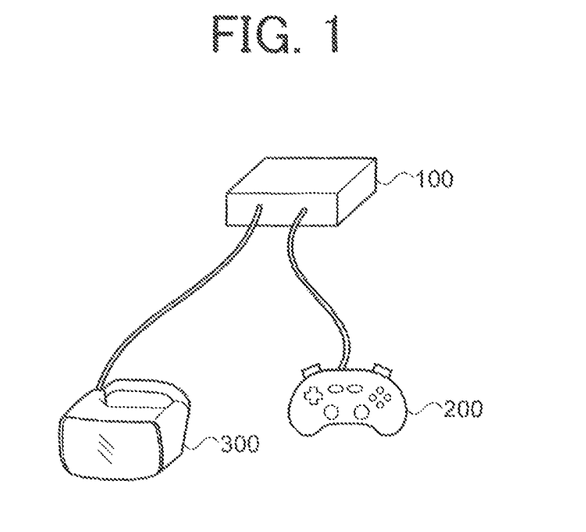
FIG. 1 is a schematic view illustrating a configuration of a game system according to the present embodiments.

Hereinafter, an explanation is given of embodiments of the present invention with reference to the drawings.
[Game System]
FIG. 1 is a schematic view illustrating a configuration of a game system according to the present embodiments.

The game system illustrated in FIG. 1 includes a game machine 100, a controller 200, and an HMD 300. The game machine 100 is a computer including a processing unit and a storage device, which is capable of executing a game program. The game machine 100 may be a dedicated home-use game machine, a personal computer, a terminal device such as a smartphone, or an arcade game machine. The controller 200 transmits an operation input by a user to the game machine 100. The controller 200 is connected to the game machine 100 by wire or wirelessly. The HMD 300 is mounted on the head part of a user and detects data of a rotation angle and motion of the head part of the user to transmit the data to the game machine 100. The HMD 300 displays an image received from the game machine 100.

Figure 2:
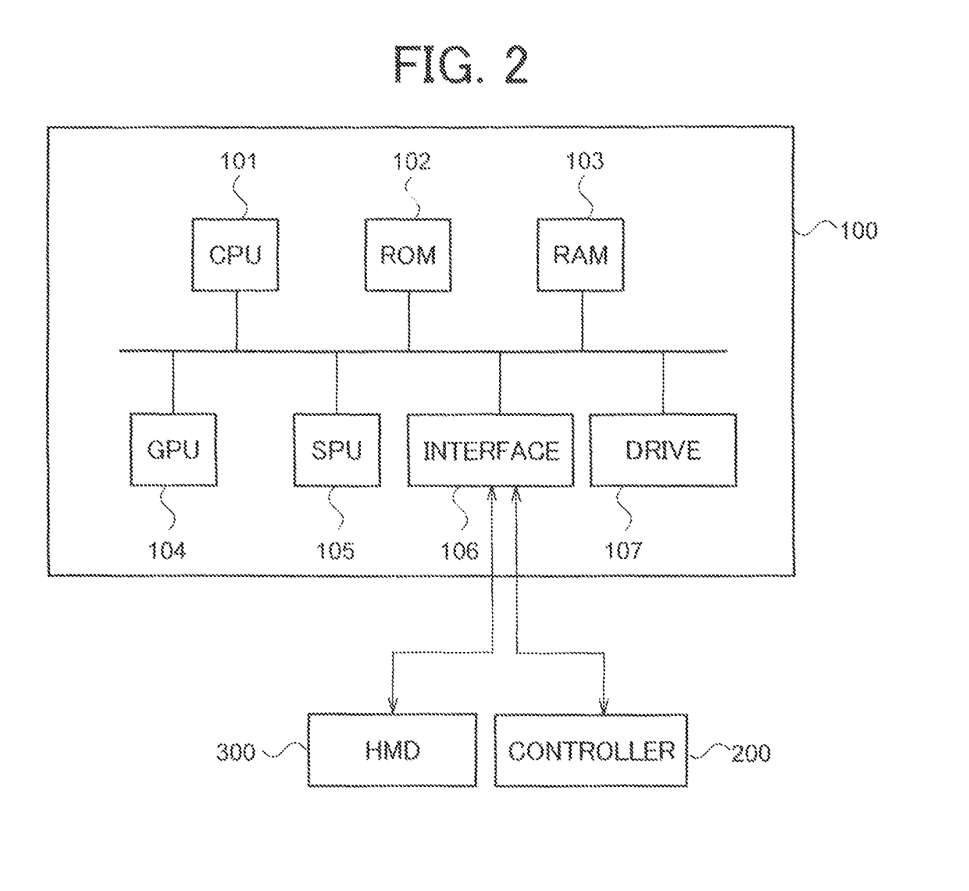
FIG. 2 is a block diagram illustrating a hardware configuration of a game machine.

FIG. 2 is a block diagram illustrating a hardware configuration of the game machine 100. The game machine 100 includes a Central Processing Unit (CPU) 101, a Read Only Memory (ROM) 102, a Random Access Memory (RAM) 103, a Graphics Processing Unit (GPU) 104, a Sound Processing Unit (SPU) 105, an interface 106, and a DRIVE 107. The CPU 101 executes a game program. The ROM 102 stores a system program. The RAM 103 stores a game program and various types of data. The GPU 104 generates an image of a virtual space. The SPU 105 processes a sound. The interface 106 is connected to the controller 200 and the HMD 300 and inputs operation information and HMD information. The interface 106 outputs an image and a sound that are processed in the GPU 104 and the SPU 105. The DRIVE 107 retrieves a game program from a storage medium storing game programs and stores the game program in the RAM 103. The storage medium may be an optical disk such as a CD, a DVD, or a Blu-ray (registered trademark) Disk or may be a magnetic disk or a semiconductor memory. The game machine 100 may have a communication function so as to obtain a game program via a network.

Figure 3:
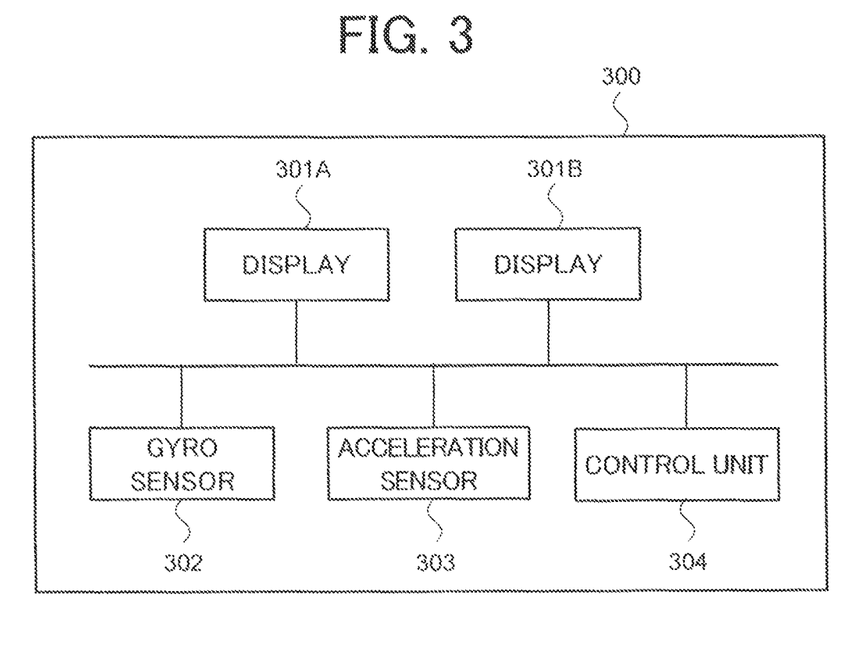
FIG. 3 is a block diagram illustrating a hardware configuration of an HMD.

FIG. 3 is a block diagram illustrating a hardware configuration of the HMD 300. The HMD 300 includes displays 301A and 301B, a gyro sensor 302, an acceleration sensor 303, and a control unit 304. The displays 301A and 301B display an image for right eye and an image for left eye, respectively. When there is parallax between an image for right eye and an image for left eye, a user sees a 3D stereoscopic image. The gyro sensor 302 detects a rotation angle of the head part of a user. When the head part of a user mounted with the HMD 300 is the origin, the front direction of the user is the roll axis, the left direction of the user is the pitch axis, and the upward direction from the head of the user is the yaw axis. The gyro sensor 302 detects rotation angles (i.e., a roll angle, a pitch angle, and a yaw angle) of the head part of the user with respect to the respective axes. The acceleration sensor 303 detects motion of the head part of a user. The control unit 304 receives images from the game machine 100 and causes the displays 301A and 301B to display the images. Furthermore, the control unit 304 transmits data detected by the gyro sensor 302 and the acceleration sensor 303 to the game machine 100.

First Embodiment

In the VR game according to the present embodiment, an image captured from the perspective of a player character in the virtual 3D space is displayed on the HMD 300. A typical VR game is First-Person Shooting (FPS). A user can move a player character by operating the controller 200. The virtual camera is controlled such that images are captured from the first-person perspective of the player character in accordance with the position and the direction of the player character. The virtual camera is controlled based on motion of the HMD 300 (i.e., motion of the head part of the user) in addition to the position and the direction of the player character. For example, when the user turns his/her head to the right, the HMD 300 detects the motion of the user's head and transmits, to the game machine 100, HMD information causing the direction of the virtual camera to turn right. The user can look over the virtual 3D space by moving his/her head.

There may be a case where a game program controls a player character without accepting operations by a user during the game. For example, in conventional non-VR games, during a cutscene where a boss character appears, the position and the direction of a player character are fixed and a scene where a boss character appears is displayed. In a case where the game program controls the player character without accepting operations by the user, unless motion of the HMD 300 is reflected on the control of the virtual camera, a gap occurs between images and the sense of the user. Therefore, in the present embodiment, the game program reflects motion of the HMD 300 on the virtual camera even in a situation where the player character is controlled without accepting operations by the user.

[Game Device]

Figure 4:
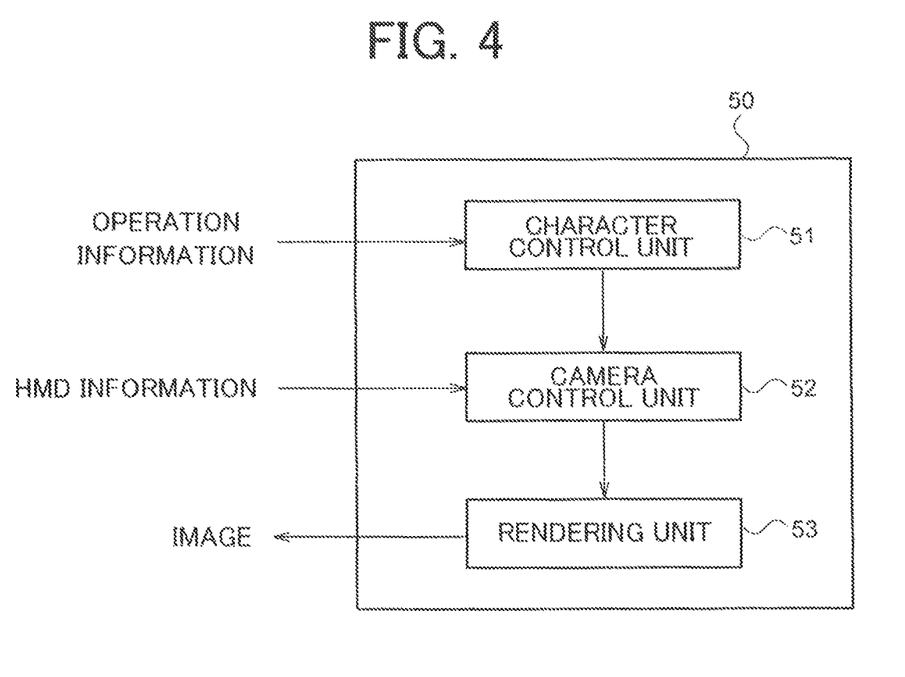
FIG. 4 is a function block diagram illustrating a functional configuration of a game device according the first embodiment.

FIG. 4 is a function block diagram illustrating a functional configuration of the game device 50 according to the first embodiment. The game device 50 includes a character control unit 51, a camera control unit 52, and a rendering unit 53. The game machine 100 executes the game program according to the present embodiment to be operated as the game device 50. The game program in the present embodiment is stored in a storage medium that can be read by the game machine 100. Here, only function units relating to the first embodiment are illustrated although the game machine 100 has functions that are not illustrated.

The character control unit 51 normally controls the position and the direction of the player character in accordance with operations by the user. During an event, the character control unit 51 ignores operations by the user and controls the player character in accordance with event data. Data for an event is executed when a predetermined condition is met in the game. During an event, the game proceeds in accordance with event data. Event data is data relating to contents of an event, such as data indicating motion of a player character, data indicating motion of an object, and data indicating motion of a virtual camera. An example of events is an event where a boss character appears. The event data of the event where a boss character appears includes data for showing a cutscene where the boss character appears, such as motions and dialogues of the boss character. Generally, during an event where a boss character appears, a virtual camera is controlled to capture the boss character.

The camera control unit 52 normally sets the direction of the virtual camera, based on the direction of the player character and the direction of the user's head, which is included in HMD information received from the HMD 300. During an event, the camera control unit 52 decides the direction of the virtual camera by adding the direction of the user's head to the direction of the virtual camera that is set based on event data.

The rendering unit 53 generates a two-dimensional (2D) image by capturing the virtual 3D space using the virtual camera. The rendering unit 53 generates an image for right eye and an image for left eye having parallax, so that, in a case where the images are displayed on the displays 301A and 301B of the HMD 300, respectively, the user can see a 3D stereoscopic image on the HMD 300.

Execution Example

An explanation is given of an execution example of camera control in the present embodiment. Here, camera control is explained using an example of an event of holding a ladder.

Figure 5:
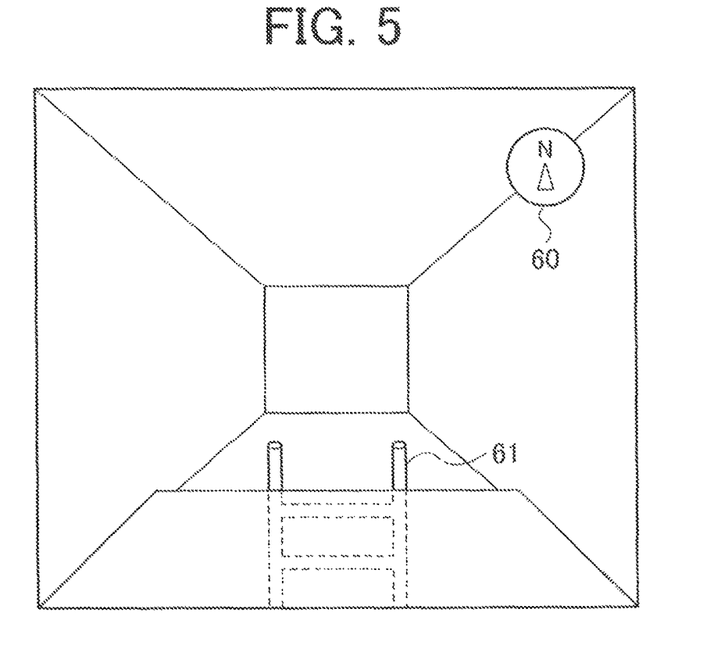
FIG. 5 is a screen displayed before a player character holds a ladder.
Figure 6:
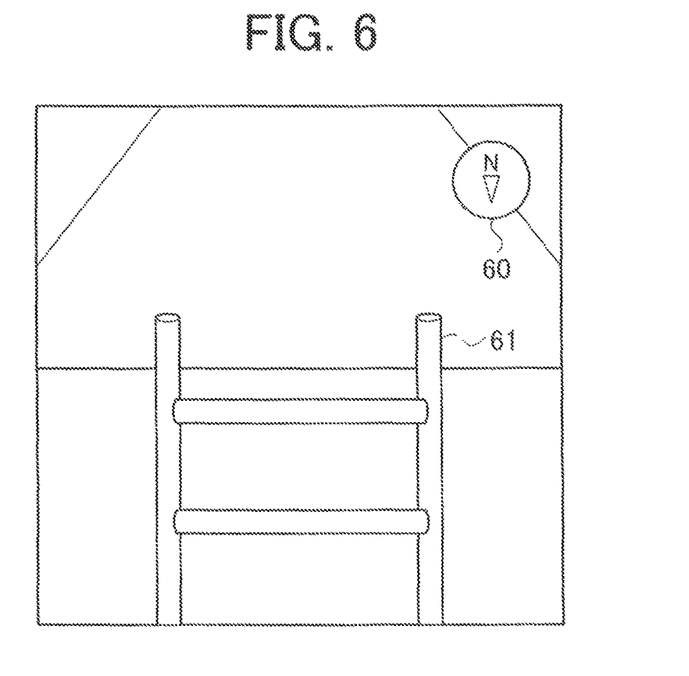
FIG. 6 is a screen displayed when a player character holds a ladder.

FIG. 5 is a screen displaying a scene before the player character holds a ladder, which is viewed from the perspective of the player character. In FIG. 5, the player character is moving in the northward direction in the virtual 3D space. The compass icon 60 at the upper right of the screen indicates the direction of the player character's view. In the north of the player character, there is a ladder 61 for going down to the lower level. Here, when the user operates a button of the controller 200, data for an even where the player character holds the ladder. After the data for the event of holding the ladder is executed, the player character holds the ladder as illustrated in FIG. 6. In FIG. 6, the player character faces the southward direction.

During the event of holding the ladder 61, the character control unit 51 rotates the direction of the player character by 180 degrees so that the position of the player character is changed from the standing position to the position of holding the ladder 61. The character control unit 51 does not accept operations by the user until the player character gets in the position of holding the ladder 61. The camera control unit 52 rotates the direction of the virtual camera by 180 degrees in accordance with the motion of the player character. When the direction of the virtual camera is rotated, the camera control unit 52 adds the direction of the user's head, which is detected by the HMD 300, to the direction of the virtual camera that is set based on event data, so as to decide the final direction of the virtual camera. Below is an explanation of controlling the virtual camera.

Figure 7A:
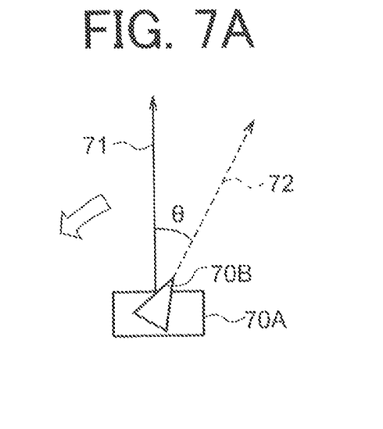
FIG. 7A is a diagram for explaining a process of reflecting a motion of the user's head on a virtual camera.
Figure 7B:
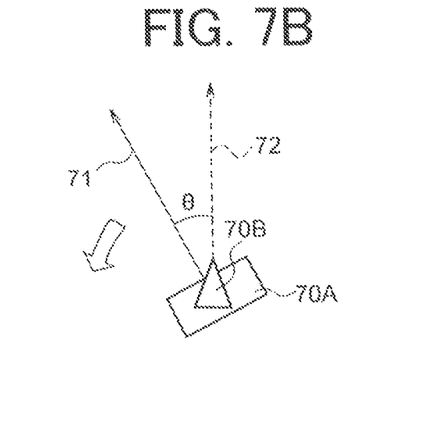
FIG. 7B is a diagram for explaining a process of reflecting a motion of the user's head on a virtual camera.
Figure 7C:
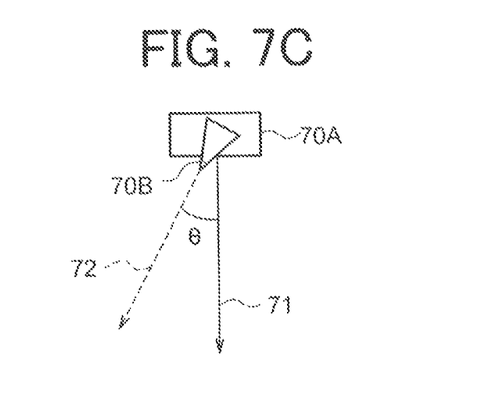
FIG. 7C is a diagram for explaining a process of reflecting a motion of the user's head on a virtual camera.

FIGS. 7A through 7C are diagrams for explaining a process of reflecting motion of the user's head on the virtual camera when the virtual camera is controlled in accordance with event data. The arrow 71 of a solid line indicates the direction of the virtual camera that is set based on event data. The arrow 72 of a dotted line indicates the direction of the virtual camera to which the direction of the user's head is added. The camera control unit 52 adds the direction of the user's head (θ), which is detected by the HMD 300, to the direction of the virtual camera (i.e., the arrow 71) that is set based on the event data, so as to obtain the direction of the virtual camera (i.e., the arrow 72).

For example, suppose that, in the situation of FIG. 5, the button is operated while the user faces rightward by 45 degrees (i.e., the virtual camera faces the northeast). In a case where there is a setting for rotating the direction of the virtual camera counterclockwise from the northward direction to the southward direction, based on the event data for holding the ladder 61, the camera control unit 52 rotates the direction of the virtual camera counterclockwise to the southwest direction from the northeast direction, which is resulted from adding the direction of the user's head (i.e., 45 degrees to the right) to the direction of the virtual camera (i.e., the northward direction) that is set based on the event data.

Note that, although the example of only reflecting the yaw angle is taken for the explanation above, the pitch angle or the roll angle may be reflected.

As explained above, according to the present embodiment, in a case where operations to a player character are restricted and a virtual camera is controlled in accordance with even data, motion of the user's head, which is detected by the HMD 300, is reflected on the direction of the virtual camera that is set based on the event data. Therefore, even in a situation where the user cannot operate the player character as he/she wants, the image displayed on the HMD 300 moves together with motion of his/her head. As a result, it is possible to reduce occurrence of simulator sickness.

Second Embodiment

Since the virtual camera is controlled in accordance with event data during an event, there is a space that is not supposed to be seen. For example, in a case where data for an event in woods is executed, trees are arranged only in directions in the perspective of the virtual camera, which is set based on event data, in the virtual 3D space. The virtual 3D space in the other directions is not supposed to be seen, and therefore trees are not arranged there. As objects are not arranged in a space that is not supposed to be seen, it is possible to delete unnecessary data and to reduce processing loads for rendering. In a case where the direction of the user's head is reflected on the virtual camera even during an event as described in the first embodiment, there is possibility that a space that is not supposed to be seen is displayed. Therefore, in the present embodiment, when a space that is not supposed to be seen is captured by the virtual camera, the screen is blacked out.

[Game Device]

Figure 8:
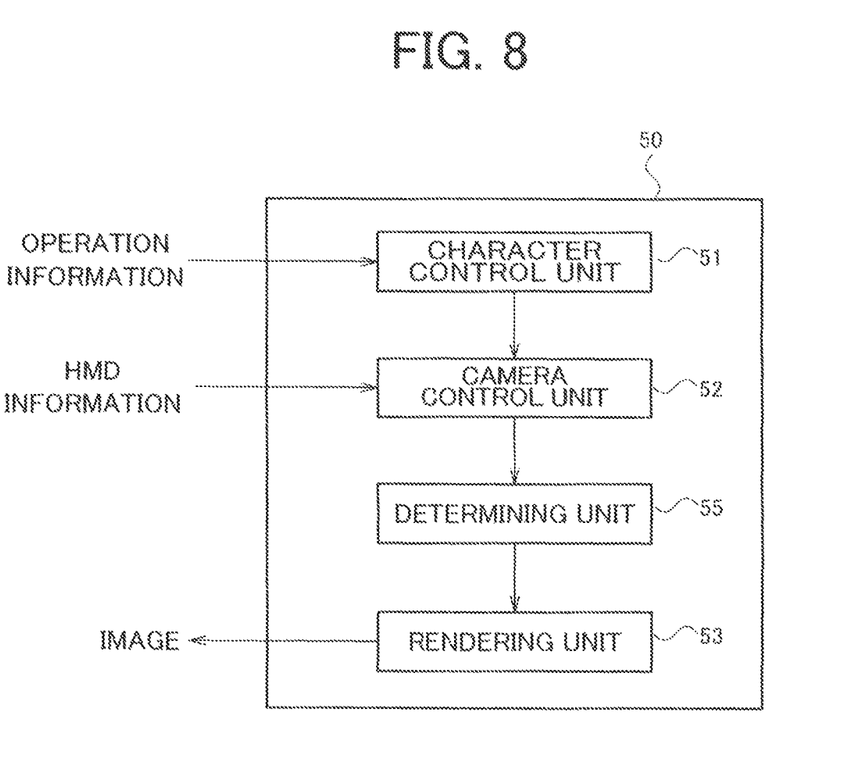
FIG. 8 is a function block diagram illustrating a functional configuration of a game device according to the second embodiment.

FIG. 8 is a function block diagram illustrating a functional configuration of the game device according the second embodiment. Regarding the game device 50 of the second embodiment, a determining unit 55 is added to the game device 50 according to the first embodiment.

As with the first embodiment, the character control unit 51 normally controls the player character in accordance with operation information and, during an event, controls the player character in accordance with event data.

As with the first embodiment, the camera control unit 52 reflects motion of the user's head, which is detected by the HMD 300, to the virtual camera even in a situation where the user cannot operate the player character.

The determining unit 55 determines whether the direction of the virtual camera is a direction within a blackout-process range. The blackout-process range is a range that is preset by game developers, in which a space that is not supposed to be seen, such as a space where rendering is omitted, is included.

The rendering unit 53 turns a screen to be output to the HMD 300 into black in a case where the determining unit 55 determines that the direction of the virtual camera is within the blackout-process range.

Figure 9:
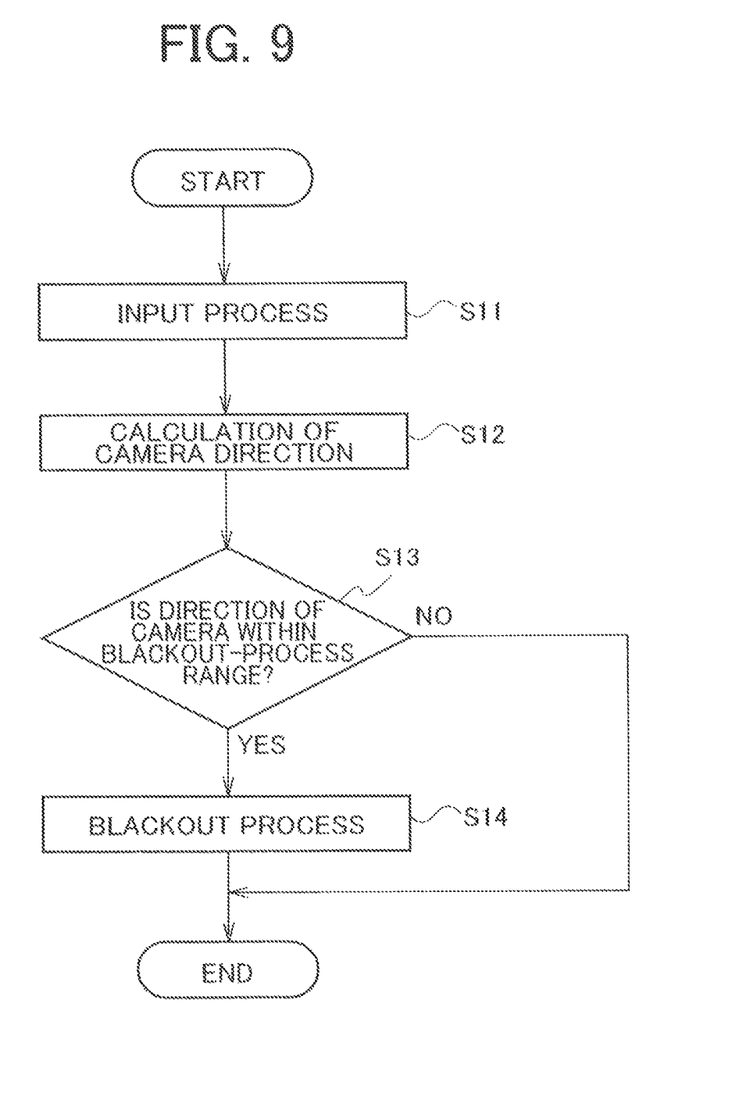
FIG. 9 is a flowchart illustrating the flow of a process performed in the game device 50 according to the second embodiment.

FIG. 9 is a flowchart illustrating the flow of a process performed in the game device 50 of the second embodiment.

The processes of FIG. 9 are executed when the player character and the virtual camera are being controlled in accordance with event data. For example, when the data for the event of holding the ladder or the event where a boss character appears as explained in the first embodiment is being executed, the processes below are executed.

The camera control unit 52 inputs motion of the user's head detected by the HMD 300 (Step S11).

The camera control unit 52 adds the direction of the user's head to the direction of the virtual camera that is set based on event data, so as to calculate the direction of the virtual camera (Step S12).

The determining unit 55 determines whether the direction of the virtual camera is within the blackout-process range (Step S13). The blackout-process range may be specified based on event data. For example, a reference line and a threshold value are predetermined. In a case where the angle between the reference line and the direction of the virtual camera exceeds the threshold value, the determining unit 55 determines that the direction of the virtual camera is within the blackout-process range. For example, the reference line is a line connecting the player character and the boss character. Alternatively, the determining unit 55 regards the north in the virtual 3D space as 0 degrees and, clockwise, regards the east as 90 degrees, the south as 180 degrees, and the west as 270 degrees. Then, the blackout-process range may be specified using directions in the virtual 3D space.

In a case where the determining unit 55 determines that the direction of the virtual camera is within the blackout-process range (YES in Step S13), the rendering unit 53 performs the blackout process (Step S14). Specifically, the rendering unit 53 starts decreasing luminance of the image in which the virtual 3D space is rendered. In a case where the direction of the virtual camera gets out of the blackout-process range after the blackout process is initiated, the rendering unit 53 cancels the blackout process and increases luminance of the image back to the original luminance. Instead of the blackout process, the rendering unit 53 may increase luminance of the image to whiteout the image. Alternatively, the rendering unit 53 may perform a mosaic process on the image to decrease resolution of the image. Alternatively, the rendering unit 53 may display a pattern in the image. For example, the rendering unit 53 displays a large arrow in the image so as to indicate the direction for the user to preferably look at.

Execution Example

An explanation is given of an execution example of the blackout process in the present embodiment.

Figure 10A:
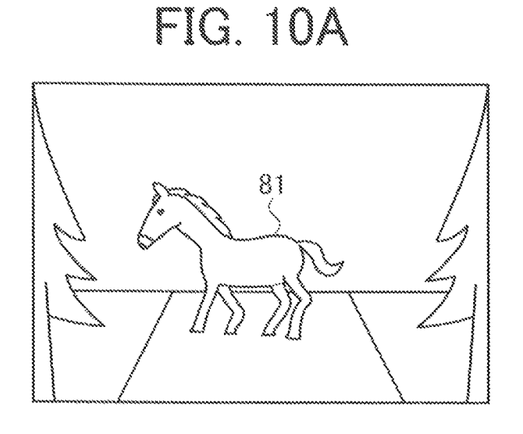
FIG. 10A is a screen displayed when an event is initiated.
Figure 10B:
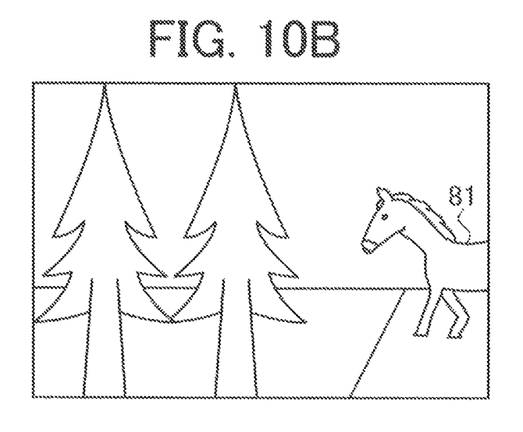
FIG. 10B is a screen displayed when a user turns his/her head to the left.
Figure 10C:
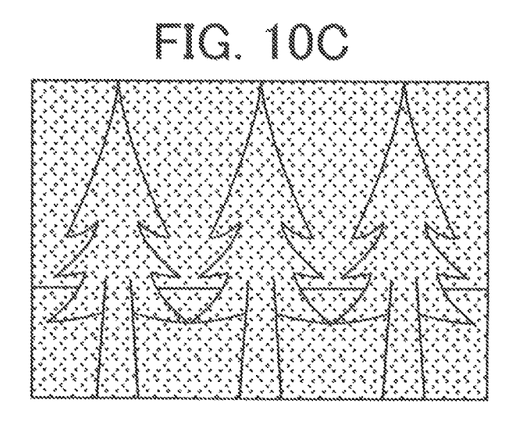
FIG. 10C is a screen when a blackout process is performed.
Figure 11A:
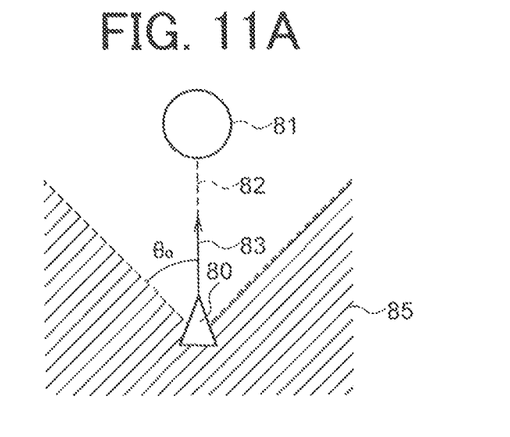
FIG. 11A is a diagram for explaining a blackout-process range.
Figure 11B:
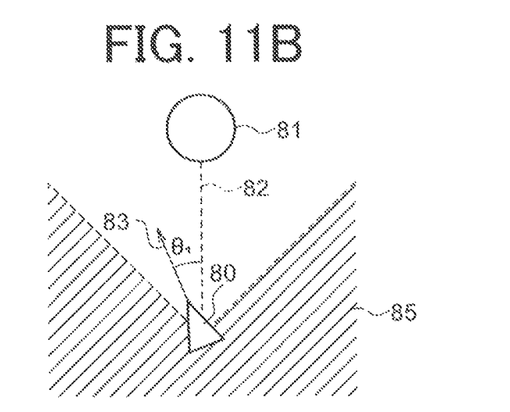
FIG. 11B is a diagram for explaining a blackout-process range.
Figure 11C:
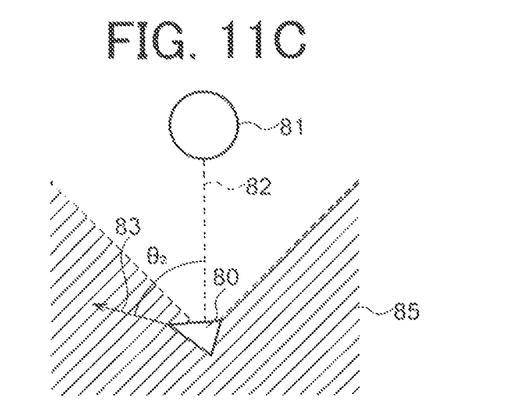
FIG. 11C is a diagram for explaining a blackout-process range.

FIGS. 10A through 10C are screens displayed when the user turns his/her head to the left during an event where a boss character 81 appears. FIGS. 11A through 11C are diagrams in which the player character 80 and the boss character 81 are viewed from an overhead position of the player character 80. The reference line 82 connecting the player character 80 and the boss character 81 is the line to be the reference for defining the blackout-process range 85. The arrow 83 indicates the direction of the virtual camera on which the direction of the user's head is reflected. In the present execution example, the blackout-process range 85 is the range in which the angle between the reference line 82 and the direction of the virtual camera is $\theta_0$ degrees or larger.

The screen of FIG. 10A is displayed when the player character encounters the boss character 81 and an event is initiated. The character control unit 51 fixes the position and the direction of the player character without accepting operations by the user, so as to show the appearance scene of the boss character 81. The virtual camera faces the boss character 81 as indicated by the arrow 83 in FIG. 11A.

Even in a case where the character control unit 51 fixes the player character, the user can move his/her head and look over the virtual 3D space as he/she wants. FIG. 10B is a screen displayed when the user turns his/her head to the left direction. The camera control unit 52 adds the direction of the user's head to the direction of the virtual camera that is set based on event data. If the user turns his/her head in the left direction by $\theta_1$ degrees, the direction of the virtual camera is obtained by adding $\theta_1$ degrees to the direction of the boss character 81 that is set based on the event data. As illustrated in FIG. 11B, since $\theta_1$ is smaller than $\theta_0$, the direction of the virtual camera is out of the blackout-process range 85. Therefore, the blackout process is not preformed.

When the user turns his/her head further to the left direction, the direction of the virtual camera is turned further to the left direction as well. As a result, since the direction of the virtual camera gets inside the blackout-process range 85, the rendering unit 53 initiates the blackout process. FIG. 10C is a screen on which the blackout process is performed. As illustrated in FIG. 11C, since $\theta_2$ is larger than $\theta_0$, the direction of the virtual camera is within the blackout-process range 85. Therefore, the blackout process is initiated.

The blackout-process range may be divided into multiple ranges so that percentage of decreasing luminance can be set for each blackout-process range. For example, from 45 degrees to 60 degrees, luminance is decreased by 50%; from 60 degrees to 75 degrees, luminance is decreased by 75%; and, at 75 degrees or higher, luminance is decreased by 100%.

Note that, although the example of making determination based on the yaw angle only is taken for the explanation above, it is possible to make determination based on the pitch angle and the roll angle as well.

As explained above, according to the present embodiment, by setting a blackout-process range in the virtual 3D space and performing a blackout process on an output image when the direction of the virtual camera is within the blackout-process range, it is possible not to display a space that is not supposed to be seen.

DESCRIPTION OF REFERENCE NUMERALS

100 . . . game machine
101 . . . CPU
102 . . . ROM
103 . . . RAM
104 . . . GPU
105 . . . SPU
106 . . . interface
107 . . . DRIVE
200 . . . controller
300 . . . HMD
301A, 301B . . . display
302 . . . gyro sensor
303 . . . acceleration sensor
304 . . . control unit
50 . . . game device
51 . . . character control unit
52 . . . camera control unit
53 . . . rendering unit
55 . . . determining unit
60 . . . compass icon
61 . . . ladder
80 . . . player character
81 . . . boss character
82 . . . reference line
85 . . . blackout-process range

The invention claimed is:

1. A game device that provides a game for a user to play with a head mount display on, the game device comprising:
an input unit configured to input a direction of a head of the user from the head mount display; and
a camera control unit configured to control a virtual camera in a virtual space by reflecting the direction of the head of the user on a direction of a player character, which is operated by the user,
wherein the camera control unit controls a direction of the virtual camera by reflecting the direction of the head of the user on the direction of the player character even in a case where an operation to the player character by the user is restricted.

2. The game device according to claim 1 comprising:
a game event processing unit configured to set the direction of the virtual camera to a predetermined direction at a time of a predetermined game event,
wherein the camera control unit decides the direction of the virtual camera by adding the direction of the head of the user to the direction of the virtual camera, which is set to the predetermined direction.

3. The game device according to claim 1 comprising:
a determining unit configured to determine whether the direction of the virtual camera is within a predetermined range; and a screen processing unit configured to perform a predetermined process on an output screen in a case where the direction of the virtual camera is within the predetermined range.

4. The game device according to claim 3, wherein the determining unit determines that the direction of the virtual camera is within the predetermined range when an angle between a reference line and the direction of the virtual camera exceeds a predetermined threshold value.

5. The game device according to claim 3, wherein the predetermined process is a process of changing luminance.

6. A control method of a game device that provides a game for a user to play with a head mount display on, the control method comprising:
   a step of inputting a direction of a head of the user from the head mount display; and
   a step of controlling a virtual camera in a virtual space by reflecting the direction of the head of the user on a direction of a player character, which is operated by the user,
   wherein, in the step of controlling the virtual camera, the virtual camera is controlled by reflecting the direction of the head of the user on the direction of the player character even in a case where an operation to the player character by the user is restricted.

7. The control method of the game device according to claim 6 comprising:
   a step of setting a direction of the virtual camera to a predetermined direction at a time of a predetermined game event,
   wherein, in the step of controlling the virtual camera, the direction of the virtual camera is decided by adding the direction of the head of the user to the direction of the virtual camera, which is set to the predetermined direction.

8. The control method of the game device according to claim 6 comprising:
   a step of determining whether the direction of the virtual camera is within a predetermined range; and
   a step of performing a predetermined process on an output screen in a case where the direction of the virtual camera is within the predetermined range.

9. The control method of the game device according to claim 8, wherein, in the step of determining, it is determined that the direction of the virtual camera is within the predetermined range when an angle between a reference line and the direction of the virtual camera exceeds a predetermined threshold value.

10. The control method of the game device according to claim 8, wherein the predetermined process is a process of changing luminance.

11. A storage medium that is read by a computer that provides a game for a user to play with a head mount display on, the storing medium storing a program that is executed by the computer, the storage medium storing an instruction causing the computer to execute a process comprising:
    inputting a direction of a head of the user from the head mount display; and
    controlling a virtual camera in a virtual space by reflecting the direction of the head of the user on a direction of a player character, which is operated by the user,
    wherein, in the controlling of the virtual camera, the virtual camera is controlled by reflecting the direction of the head of the user on the direction of the player character even in a case where an operation to the player character by the user is restricted.

12. The storage medium according to claim 11, the process comprising:
    setting a direction of the virtual camera to a predetermined direction at a time of a predetermined game event,
    wherein, in the controlling of the virtual camera, the direction of the virtual camera is decided by adding the direction of the head of the user to the direction of the virtual camera, which is set to the predetermined direction.

13. The storage medium according to claim 11, the process comprising:
    determining whether the direction of the virtual camera is within a predetermined range; and
    performing a predetermined process on an output screen in a case where the direction of the virtual camera is within the predetermined range.

14. The storage medium according to claim 13, wherein, in the determining, it is determined that the direction of the virtual camera is within the predetermined range when an angle between a reference line and the direction of the virtual camera exceeds a predetermined threshold value.

15. The storage medium according to claim 13, wherein the predetermined process is a process of changing luminance.

* * * * *